(12) United States Patent
Rothmund et al.

(10) Patent No.: US 11,013,178 B2
(45) Date of Patent: May 25, 2021

(54) TRANSVERSE CONVEYOR OF AN AGRICULTURAL HARVESTING MACHINE

(71) Applicant: CLAAS Saulgau GmbH, Bad Saulgau (DE)

(72) Inventors: Stefan Rothmund, Hohentengen (DE); Siegfried Gernert, Bad Waldsee-Mittelurbach (DE); Ulrich Biesenberger, Bad Saulgau-Friedberg (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 67 days.

(21) Appl. No.: 16/280,875

(22) Filed: Feb. 20, 2019

(65) Prior Publication Data
US 2019/0274250 A1 Sep. 12, 2019

(30) Foreign Application Priority Data
Mar. 6, 2018 (DE) .......................... 102018105108.5

(51) Int. Cl.
*A01D 61/00* (2006.01)
*A01D 34/66* (2006.01)

(52) U.S. Cl.
CPC ......... *A01D 61/004* (2013.01); *A01D 34/668* (2013.01)

(58) Field of Classification Search
CPC .. A01D 61/008; A01D 61/002; A01D 61/004; A01D 34/668; B65G 65/22
USPC .......... 100/146, 145; 198/513, 669; 56/14.5, 56/16.4 R
See application file for complete search history.

(56) References Cited

U.S. PATENT DOCUMENTS

| | | | |
|---|---|---|---|
| 1,780,481 A | 11/1930 | Hale | |
| 2,682,948 A | 7/1954 | Millard et al. | |
| 3,060,665 A | 10/1962 | Escher | |
| 3,505,699 A | 4/1970 | Trumbull | |
| 3,509,699 A | 5/1970 | Calder | |
| 4,177,626 A * | 12/1979 | McNaught | A01D 61/008 198/513 |
| 4,458,697 A * | 7/1984 | James | A01D 61/008 460/74 |
| 4,546,599 A | 10/1985 | Cicci et al. | |

(Continued)

FOREIGN PATENT DOCUMENTS

| | | |
|---|---|---|
| IE | 19809987 A1 | 9/1999 |
| IE | 102005020462 A1 | 11/2006 |

*Primary Examiner* — Arpad Fabian-Kovacs

(57) ABSTRACT

Transverse conveyor (10) of an agricultural harvesting machine, with a basic body (13), the axis of rotation of which extends transversely with respect to the longitudinal direction of a harvesting vehicle carrying the harvesting machine, and with at least two helical transverse conveyor elements (14a, 14b) which are connected to the basic body (13) and have at least two windings (15a, 15b), wherein the respective transverse conveyor element (14a, 14b) serves for conveying crop from a respective lateral edge portion (16, 18) of the transverse conveyor in the direction of a central portion (17) of the transverse conveyor. According to the invention, a distance between adjacently arranged windings (15a, 15c, 15b, 15d) of the transverse conveyor element (14a, 14c, 14b, 14d) is smaller in the region of the lateral edge portions (16, 18) of the transverse conveyor (10) than in the central portion (17) of the transverse conveyor (10).

6 Claims, 2 Drawing Sheets

(56) References Cited

U.S. PATENT DOCUMENTS

| | | | | |
|---|---|---|---|---|
| 7,621,113 | B2 * | 11/2009 | Blakeslee | A01D 61/004 56/14.5 |
| 8,434,290 | B2 * | 5/2013 | Barnett | A01D 34/668 56/6 |
| 2002/0189224 | A1 * | 12/2002 | Lauer | A01D 61/008 56/16.6 |
| 2011/0005181 | A1 * | 1/2011 | Barnett | A01D 61/002 56/157 |
| 2012/0216498 | A1 | 8/2012 | Barnett et al. | |
| 2013/0160416 | A1 * | 6/2013 | Bollig | A01D 45/021 56/119 |

* cited by examiner

TRANSVERSE CONVEYOR OF AN AGRICULTURAL HARVESTING MACHINE

The invention relates to a transverse conveyor of an agricultural harvesting machine according to the precharacterizing clause of claim 1. The invention furthermore relates to an attachment of an agricultural harvesting vehicle with such a transverse conveyor and to an agricultural harvesting vehicle with such an attachment.

DE 198 09 987 A1 discloses a rotor mower which comprises a transverse conveyor. The transverse conveyor has a drum-like basic body which is driveable about an axis of rotation. Said axis of rotation extends here transversely with respect to a longitudinal direction of a harvesting vehicle accommodating the rotor mower. Two transverse conveyor elements are connected to the drum-like basic body. A first transverse conveyor element is arranged on a first side of the basic body and a second transverse conveyor element is arranged on a second side of the basic body. Each of the transverse conveyor elements is formed helically and has at least two windings. Each winding extends here by 360° around the basic body. A winding of such a helical transverse conveyor element is also referred to as a thread of the transverse conveyor element. With the two transverse conveyor elements, crop can be conveyed from a respective lateral edge region of the transverse conveyor in the direction of a central portion of the transverse conveyor.

There is a need to improve the conveying action of a transverse conveyor of an agricultural harvesting machine.

Taking this as the starting point, the present invention is based on the object of providing a novel transverse conveyor of an agricultural harvesting machine and an attachment and an agricultural harvesting vehicle with such a transverse conveyor.

This object is achieved by a transverse conveyor of an agricultural harvesting machine according to claim 1.

According to the invention, a distance between adjacently arranged windings of the transverse conveyor element is smaller in the region of the lateral portions of the transverse conveyor than in the central portion of the transverse conveyor.

Owing to the fact that a distance between directly adjacent windings and therefore threads of the transverse conveyor elements is smaller in the region of the lateral edge portions of the transverse conveyor than in a central portion of the transverse conveyor, the conveying action of the transverse conveyor can be improved. There is no risk of crop passing in the region of the edge portions into corners of an equipment trough. By means of the smaller distance between directly adjacent windings or threads of the transverse conveyor elements in the region of the lateral edge portions, the crop is more rapidly conveyed from the respective lateral edge portion in the direction of the central portion of the transverse conveyor.

According to a first variant of the invention, a first helical transverse conveyor element having at least two windings extends from a first edge portion of the transverse conveyor in the direction of the central portion of the transverse conveyor, wherein a second helical transverse conveyor element having at least two windings extends from a second edge portion of the transverse conveyor in the direction of the central portion of the transverse conveyor, wherein in the region of the first lateral edge portion of the transverse conveyor, a third helical transverse conveyor element is positioned between at least one winding of the first helical transverse conveyor element, and wherein in the region of the second lateral edge portion of the transverse conveyor, a fourth helical transverse conveyor element is positioned between at least one winding of the second helical transverse conveyor element. The first variant is structurally particularly simple and also permits retrofitting of existing transverse conveyors.

According to an advantageous development of the first variant of the invention, in the region of the first and second lateral edge portion, the third and fourth transverse conveyor element are each positioned in the centre or approximately in the centre of the outermost winding of the first helical transverse conveyor element and of the second helical transverse conveyor element, respectively. This configuration is particularly preferred in order to provide an optimized conveying action of the transverse conveyor.

According to a second variant of the invention, a first helical transverse conveyor element having at least two windings extends from a first edge portion of the transverse conveyor in the direction of the central portion of the transverse conveyor, wherein a second helical transverse conveyor element having at least two windings extends from a second edge portion of the transverse conveyor in the direction of the central portion of the transverse conveyor, wherein in the region of the first lateral edge portion of the transverse conveyor, a pitch of the first transverse conveyor element is smaller than in the central portion of the transverse conveyor, and wherein in the region of the second lateral edge portion of the transverse conveyor, a pitch of the second transverse conveyor element is smaller than in the central portion of the transverse conveyor. The second variant of the invention is structurally less complicated than the first variant of the invention, but also permits the optimization of the conveying action of a transverse conveyor of an agricultural harvesting vehicle using simple means.

The attachment is defined in claim 8 and the agricultural harvesting vehicle is defined in claim 9.

Preferred developments of the invention emerge from the dependent claims and the description below. Exemplary embodiments of the invention will be explained in more detail, without being restricted thereto, with reference to the drawing, in which:

Figure 1:
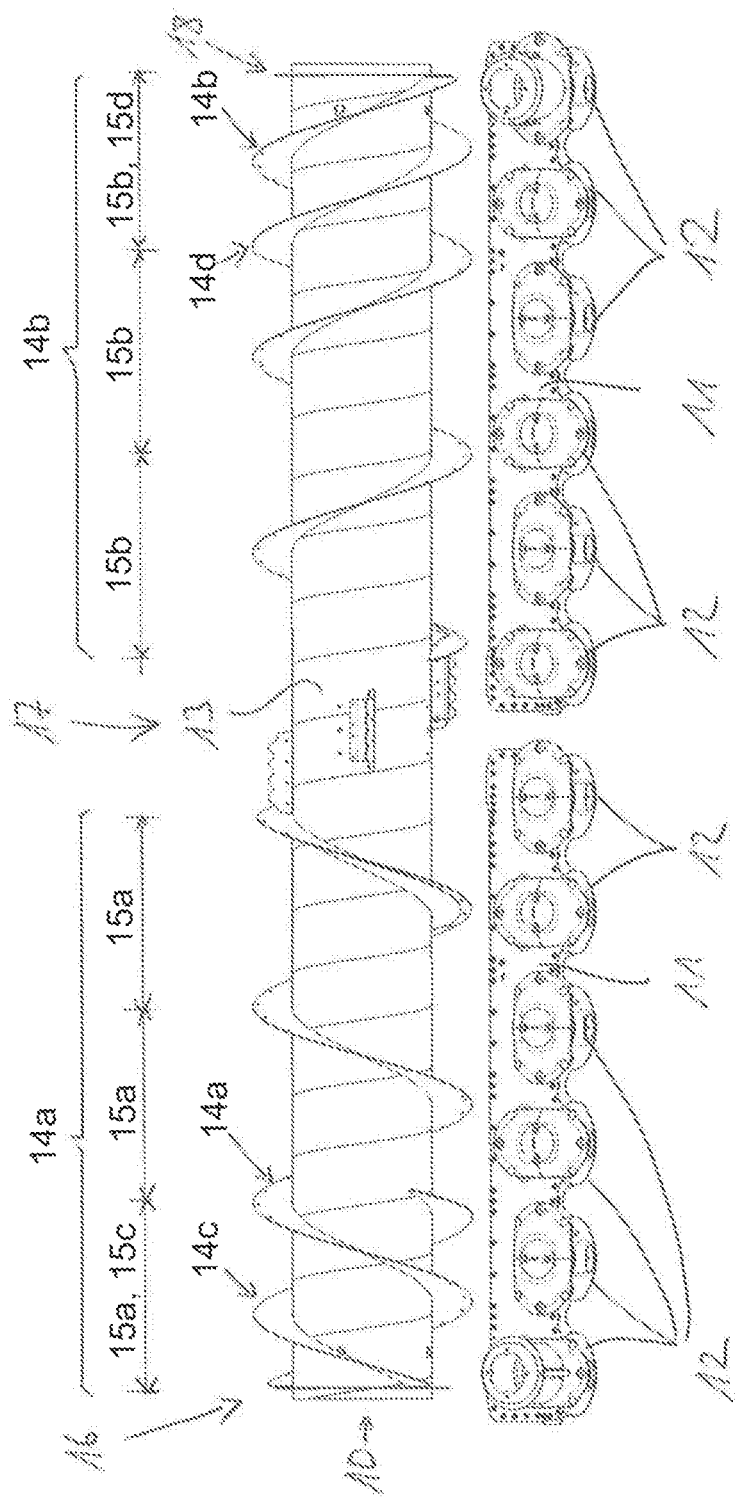
FIG. 1 shows a top view of a transverse conveyor according to the invention of an agricultural harvesting machine with a mower unit.

FIG. 1 shows a top view of a transverse conveyor 10 according to the invention of an agricultural harvesting machine with a mower bar 11 positioned in front of the transverse conveyor 10.

The transverse conveyor 10 and the mower bar 11 are part of a harvesting machine which is designed as a mowing unit and is designed as an attachment of an agricultural harvesting vehicle. Such mower units are also referred to as direct cutting units and are particularly advantageously used as attachments on self-propelling field choppers when producing what is referred to as whole crop silage.

The mower bars 11 have a plurality of mower members 12 which are positioned next to one another and serve in particular for mowing types of cereal, grass or other crop. Crop cut by the mower members 12 of the mower bars 11 pass into the region of the transverse conveyor 10, wherein the transverse conveyor 10 comprises a drum-like basic body 13 and a plurality of transverse conveyor elements 14. The axis of rotation of the basic body 13 extends transversely with respect to the longitudinal direction of a harvesting vehicle carrying the harvesting machine, in particular a self-propelling field chopper.

A first transverse conveyor element 14a is arranged on a first side of the drum-like basic body 13. A second transverse conveyor element 14b is arranged on a second side of the drum-like basic body 13. The transverse conveyor elements 14a, 14b are connected to the drum-like basic body 13.

The first transverse conveyor element 14a and the second transverse conveyor element 14b are each formed helically with at least two windings. In the exemplary embodiment shown, the first transverse conveyor element 14a and the second transverse conveyor element 14b each provides three windings. A winding should be understood as meaning a portion of the helical transverse conveyor element 14a, 14b that extends once by 360° around the drum-like basic body 13. A winding is also referred to as a thread. In FIG. 1, for the two transverse conveyor elements 14a, 14b, the portions of the respective windings thereof are visualized by reference signs 15a, 15b.

The first transverse conveyor element 14a extends from a first lateral edge portion 16 of the transverse conveyor 10 in the direction of a central portion 17. The second transverse conveyor element 14b extends from an opposite second edge portion 18 of the transverse conveyor 10 likewise in the direction of the central portion 17 thereof.

The first transverse conveyor element 14a serves for conveying crop from the first lateral edge portion 16 in the direction of the central portion 17. The second transverse conveyor element 14b serves for conveying crop from the second edge portion 18 in the direction of the central portion 17. From the central portion 17, the crop is transferred to an intake device (not illustrated) of the harvesting vehicle, in particular field chopper.

A distance between directly adjacent windings of the transverse conveyor elements is smaller in the region of the lateral edge portions 16, 18 of the transverse conveyor 10 than in the central portion 17 of the transverse conveyor 10. The conveying action of the transverse conveyor 10 can thereby be increased.

In the exemplary embodiment shown in FIG. 1, the first transverse conveyor element 14a with the three windings 15a extends from the first edge portion 16 in the direction of the central portion 17 of the transverse conveyor 10. The second transverse conveyor element 14b with the three windings 15b extends from the second edge portion 18 in the direction of the central portion 17. The number of windings of the first transverse conveyor element 14a and of the second transverse conveyor element 14b is in each case at least two.

In the region of the first lateral edge portion 16 of the transverse conveyor 10, in the exemplary embodiment of FIG. 1 a third helical transverse conveyor element 14c is positioned between at least one winding 15a of the first helical transverse conveyor element 14a and connected to the basic body 13.

Similarly, a fourth helical transverse conveyor element 14d is present on the opposite side of the transverse conveyor 10 in the region of the second lateral edge portion 18 of the transverse conveyor 10, said transverse conveyor element 14d being arranged between at least one winding 15b of the second helical transverse conveyor element 14b and being connected to the basic body 13.

By this means, in the region of the two edge portions 16 and 18 of the transverse conveyor 10, specifically in the region of at least the outermost lateral winding 15a, 15b of the respective first and second transverse conveyor 14a, 14b having a plurality of windings, the distance between directly adjacent windings is reduced by the provision of the third transverse conveyor element 14c and the fourth transverse conveyor element 14d, respectively.

In the exemplary embodiment shown, the first helical transverse conveyor element 14a has a constant pitch. Similarly, the second helical transverse conveyor element 14b has a constant pitch.

The third transverse conveyor element 14c and the fourth transverse conveyor element 14d each have a single winding 15c and 15d running in an overlapping manner with respect to the respective laterally outermost winding 15a, 15b of the first and second helical transverse conveyor element 14a, 14b, specifically preferably in such a manner that the third transverse conveyor element 14c is positioned in the centre or approximately in the centre of the laterally outermost winding 15a of the first transverse conveyor element 14a and the fourth transverse conveyor element 14d is positioned in the centre or approximately in the centre of the laterally outermost winding 15b of the second helical transverse conveyor element 14b. Accordingly, in the region of the laterally outermost windings 15a, 15b of first and second transverse conveyor element 14a, 14b, the winding 15c, 15d of third and fourth transverse conveyor elements 14c, 14d is rotated by 180° or approximately 180° with respect to the windings 15a, 15b of the first and second transverse conveyor element 14a, 14b.

By means of the reduced distance of directly adjacent windings of the transverse conveyor elements of the transverse conveyor 10 in the region of the lateral edge portions 16, 18 thereof, crop which is to be conveyed in the region of said lateral edge portions 16, 18 in the direction of the central portion 17 is conveyed more rapidly in the direction of the central portion 17, and therefore the risk of the crop dropping out of the region of the transverse conveyor 10 is reduced. The conveying action of the transverse conveyor 10 can thus be increased.

As already explained, in the exemplary embodiment shown the third transverse conveyor 14c extends over the region of the laterally outermost winding 15a of the first transverse conveyor 14a, and the fourth transverse conveyor element 14d also extends over the region of the laterally outermost winding 15b of the second transverse conveyor element 14b. Accordingly, the third and fourth transverse conveyor element 14c, 14d each run once by 360° around the drum-like basic body 13, specifically, as already explained, offset by 180° or approximately 180° with respect to the respective laterally outermost winding 15a, 15b of the first and second transverse conveyor element 14a, 14b.

In the exemplary embodiment, all of the transverse conveyor elements 14a, 14b, 14c and 14d have the same pitch, and therefore the respective winding of the respective transverse conveyor element, when said winding runs by 360° around the drum-like basic body 13, accordingly stands over an axial portion of identical length along the drum-like basic body 13.

Such a design of the transverse conveyor 10 according to the invention is structurally simple, is suitable for the retrofitting of existing transverse conveyors and permits the provision of an optimized conveying action or conveying capacity of the transverse conveyor 10.

It is possible for the third and fourth transverse conveyor element 14c, 14d to be shorter or longer than a winding. The third and fourth transverse conveyor element 14c, 14d can thus each extend by 360°±90° around the basic body 13. The range of ±90° defines a third and fourth transverse conveyor element 14c, 14d with approximately one winding 15c, 15d.

Figure 2:
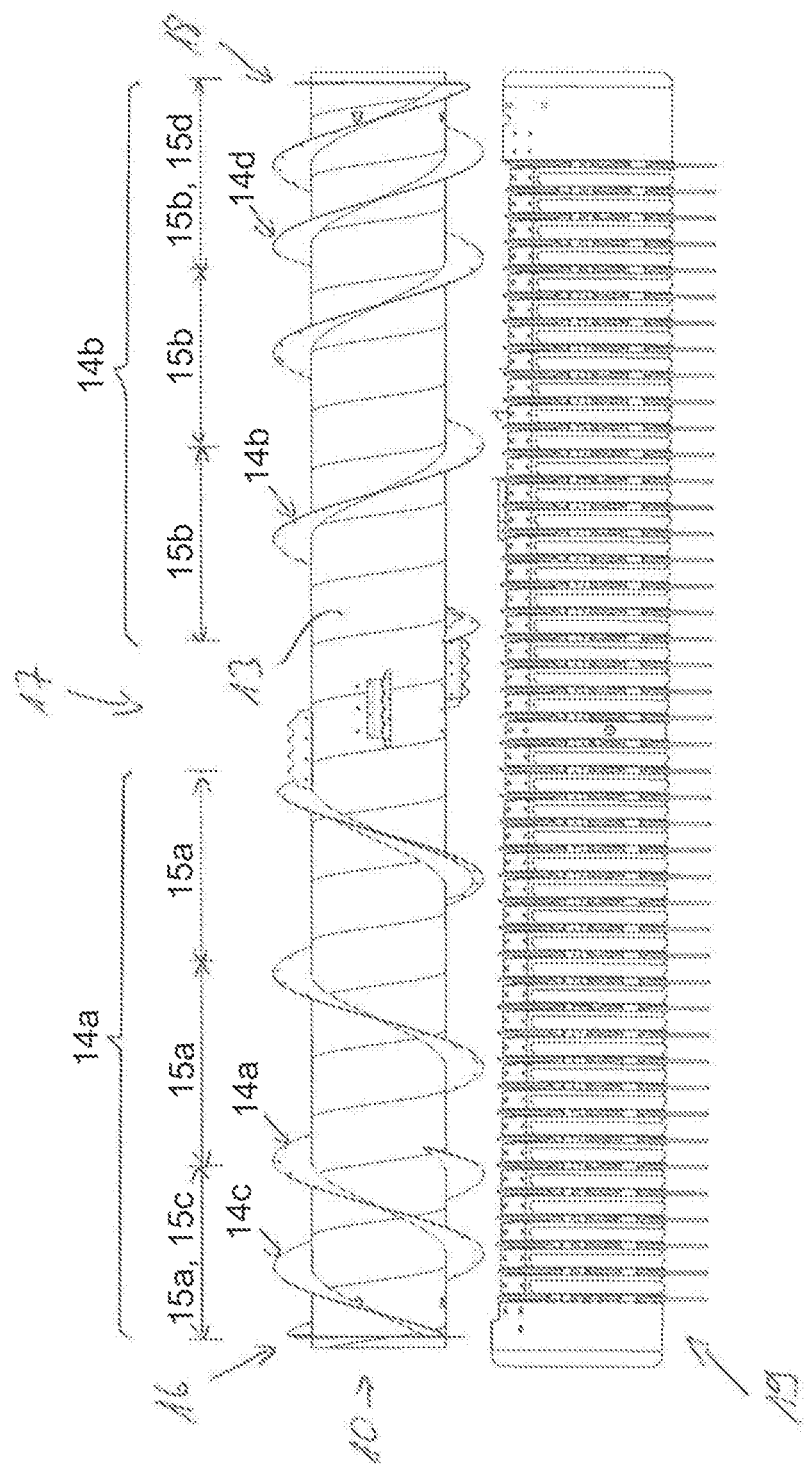
FIG. 2 shows a top view of the transverse conveyor according to the invention of an agricultural harvesting machine with a pick-up device.

FIG. 2 shows the transverse conveyor 10 which has already been described with reference to FIG. 1 together with a pick-up device 19 for crop, wherein said pick-up device 19 can be an assembly of what is referred to as a pick-up.

In contrast to the exemplary embodiment shown, according to a second variant a transverse conveyor is also possible in which again a first helical transverse conveyor element having at least two windings extends from the first edge portion 16 of the transverse conveyor 10 in the direction of the central portion 17 of the transverse conveyor, and wherein again a second helical transverse conveyor element having at least two windings extends from the second edge portion 18 of the transverse conveyor 17 in the direction of the central portion 17 of the transverse conveyor 10. According to the second variant, it is then provided that, in the region of the first lateral edge portion 16 of the transverse conveyor 10, a pitch of the first transverse conveyor element is smaller than in the central portion of the transverse conveyor 10. Similarly, in the region of the second lateral edge portion 18 of the transverse conveyor 10, a pitch of the second transverse conveyor element is smaller than in the central portion 17 of the transverse conveyor. The distance between directly following or directly adjacent windings of the transverse conveyor or of the transverse conveyor elements can thereby also be configured in such a manner that the distance in the region of the edge portions 16, 18 is smaller than in the central portion 17 of the transverse conveyor.

In this case, only first and second transverse conveyor elements and not additionally third and fourth transverse conveyor elements are then present. The first and second transverse conveyor elements then do not have constant pitches, but rather variable pitches, with the pitch increasing or becoming larger from the respective edge portion 16, 18 in the direction of the central portion 17.

The invention not only relates to the transverse conveyor 10 as such but, furthermore, also to an attachment of an agricultural harvesting vehicle with such a transverse conveyor and to an agricultural harvesting vehicle with such an attachment.

The attachment can be, for example, a pick-up device or pick-up or else a mower unit.

The agricultural harvesting vehicle is in particular a field chopper.

However, the transverse conveyor 10 can also be used in a combine harvester.

LIST OF REFERENCE SIGNS

10 Transverse conveyor
11 Mower beam
12 Mower member
13 Basic body
14a Transverse conveyor element
14b Transverse conveyor element
14c Transverse conveyor element
14d Transverse conveyor element
15a Winding
15b Winding
15c Winding
15d Winding
16 Edge portion
17 Central portion
18 Edge portion
19 Pick-up device

The invention claimed is:

1. A transverse conveyor (10) of an agricultural harvesting machine comprising:
    a basic body (13), an axis of rotation of which extends transversely with respect to the longitudinal direction of a harvesting vehicle carrying the agricultural harvesting machine having at least two helical transverse conveyor elements (14a, 14b) which are connected to the basic body (13) and have at least two windings (15a, 15b), wherein the respective transverse conveyor element (14a, 14b) serves for conveying crop from a respective lateral edge portion (16, 18) of the transverse conveyor in the direction of a central portion (17) of the transverse conveyor;
    a third helical transverse conveyor element (14c) having one or approximately one winding disposed in the region of the first lateral edge portion (16) of the transverse conveyor and between at least one winding (15a) of the first helical transverse conveyor element (14a),
    a fourth helical transverse conveyor element (14d) having one or approximately one winding disposed in the region of the second lateral edge portion (18) of the transverse conveyor and between at least one winding (15b) of the second helical transverse conveyor element (14b), and
    wherein a distance between adjacently arranged windings (15a, 15c, 15b, 15d) of the transverse conveyor elements (14a, 14c, 14b, 14d) is smaller in the region of the lateral edge portions (16, 18) of the transverse conveyor than in the central portion (17) of the transverse conveyor.

2. A transverse conveyor according to claim 1, characterized in that the first helical transverse conveyor element (14a) and the second helical transverse conveyor element (14b) each have a constant pitch.

3. A transverse conveyor according to claim 1, characterized in that, in the region of the first lateral edge portion (16), the third transverse conveyor element (14c) is positioned in the centre or approximately in the centre of the laterally outermost winding (15a) of the first transverse conveyor element (14a).

4. A transverse conveyor according to claim 1, characterized in that, in the region of the second lateral edge portion (18), the fourth transverse conveyor element (14d) is positioned in the centre or approximately in the centre of the laterally outermost winding (15b) of the second transverse conveyor element (14b).

5. An attachment of an agricultural harvesting vehicle with a transverse conveyor according to claim 1.

6. An agricultural harvesting vehicle, in particular field chopper, with an attachment according to claim 5.

* * * * *